United States Patent [19]

Barrall et al.

[11] Patent Number: 5,225,380
[45] Date of Patent: Jul. 6, 1993

[54] PHOSPHATE CERAMIC HARD TILES

[75] Inventors: Jeffery L. Barrall, Lancaster, Pa.; Valerie H. Kresge, Fairport, N.Y.

[73] Assignee: Armstrong World Industries, Inc., Lancaster, Pa.

[21] Appl. No.: 811,844

[22] Filed: Dec. 23, 1991

[51] Int. Cl.$^5$ .................... C04B 35/02; C04B 35/04; C04B 35/52; B28B 3/00
[52] U.S. Cl. .................... 501/119; 501/101; 501/108; 501/121; 501/142; 501/153; 264/333; 106/638; 106/801
[58] Field of Search ............ 501/100, 108, 111, 118, 501/121, 124, 142, 153; 106/638, 801, 819; 264/333

[56] References Cited

U.S. PATENT DOCUMENTS 4,792,359 12/1988 Barrall et al. .............. 501/111
4,872,912 10/1989 Barrall et al. .............. 501/111

*Primary Examiner*—Mark L. Bell
*Assistant Examiner*—Michael A. Marcheschi

[57] ABSTRACT

Calcium aluminum magnesium phosphate ceramic hard tiles and processes for them are described. The tiles have a density in excess of about 110 pounds per cubic foot, a curl value less than about 20 mils and a flexural strength of at least about 2500 pounds per square inch. To prepare the hard tiles 100 parts (by wt.) of an aluminum phosphate-phosphoric acid solution is mixed with at least 5 parts magnesium oxide and 50-110 parts wollastonite. If the acid has more than 15% by weight water, then mica or vermiculite is added.

16 Claims, No Drawings

PHOSPHATE CERAMIC HARD TILES

BACKGROUND OF THE INVENTION

Field of the Invention

The present invention relates to phosphate ceramic hard tiles. Hard tiles cover surfaces, and must be curl resistant, dimensionally stable and have high strength and density. Hard floor tiles in particular need high strength and density.

Ceramics made with phosphoric acid, calcium silicate, and metal oxides are described in U.S. Pat. No. 4,375,516. This reference relates to both foamed and non-foamed phosphate ceramic compositions which are recognized as useful for the preparation of building and insulating materials. The properties needed for hard tiles, and in particular, for hard floor tiles, however, are not found. Flexural strength and density of the phosphate ceramics, in particular have been found to be too low for hard tiles. This particular kind of tile (hard tiles) are required to be highly durable, especially the flooring tiles.

Previously, ceramics would have adequate breaking strength only at impractically large dimensions of thickness, and even then still lacked adequate flexural strength, durability, and density to provide hard tiles.

The present application, however, provides phosphate ceramic hard tiles which have the superior strength, high density, and the flexural and breaking strength needed in hard tiles. Characteristically the tiles also have a high degree of dimensional stability.

SUMMARY OF THE INVENTION

The phosphate ceramic hard tile of the present invention is a calcium aluminum magnesium phosphate ceramic which has a density of at least about 110 lb/ft$^3$, and a superior flexural strength of a minimum of about 2500 PSI. These tiles have the low curl value needed. Regardless of the size, the hard tile should, acceptably, have a maximum curl value of about 20 mils.

Higher flexural strengths allow the tiles to be thinner. The measured breaking strength of a tile varies with thickness, decreasing as the tile gets thinner. By providing a phosphate ceramic having even higher flexural strengths, thinner tiles can be made which still have a breaking strength high enough for strenuous use (such as flooring tile) in spite of the fact that the tiles are so thin.

Floor tiles can be made which have a thickness down to about 0.25 inch. Tiles which are not load-bearing can be even thinner, even down to about 0.15 inches (tiles, for example, which may be used for decoration and/or on walls).

These phosphate ceramic hard tiles have superior breaking strength. They are also distinctively, dimensionally stable and curl resistant even when exposed to water on one side.

DETAILED DESCRIPTION

Hard tiles are referred to as "hard" because of their durability and strength. Characteristically, these tiles of the present invention have a minimum density of at least about 110 lb/ft$^3$, and a flexural strength of at least about 2500 PSI. Some embodiments, such as floor-covering tiles require more durability. In such cases the tiles may have a more preferred, higher flexural strength, of at least about 3500 PSI or even 4500 PSI. A more preferred density is at least about 135 lb/ft$^3$.

The "curl value" is defined as the distance which the edge of a tile moves (raising away from the flat plane) after the tile is exposed to water on one of its large flat surfaces (normally the bottom of the tile). The tile itself (regardless of the size or type of surface to be covered) should have a curl value at a maximum of about 20 mils. Expressed as mils per inch of the tile's length, a preferred curl value is a maximum measurement of about 2 mils per inch of tile length. A ceramic tile having this curl value (of 2 mils per inch) could be 10×10 inches before the tile would be impractical for surface covering. Smaller tiles can tolerate higher values. Tiles intended for use in covering walls can be thinner and, for example, could also have a higher curl value per inch of length. A value of about 5 mils or less per inch of tile length, for example, could be tolerated (up to about 20 mils total for a tile of any size).

Another important characteristic of the present tiles is their low porosity values. A tile with low porosity has a low dimensional change in the presence of moisture. A good porosity for the ceramic is about 7% or less (measured by the mercury intrusion test) while more preferred embodiments have a porosity of about 5% or less.

The use of ceramic made with phosphoric acid and wollastonite and metal oxides for tiles has been severely limited and even impossible because the finished ceramic frequently would develop internal brushite crystals. This would especially occur when the ceramic contacted water. The internal growth and presence of brushite would also cause undesired dimensional change, enlarging the tile because of the growing brushite. When the phosphate ceramic was made in the shape of a tile, the tile would curl because the tile typically was exposed to more water on one side than on the other, making the brushite grow more on the side having the most water exposure.

With higher porosity and the growth of brushite, the curl values of ceramic tiles was high. The tile must have low curl values so that it can lay flat on the surface that it covers. It is also desirable to have low dimensional change in spite of the presence of water.

The dimensional changes made ceramic very unsuitable for surface covering until porosity was lowered in the ceramic, and it was discovered that brushite could be prevented by making the ceramic with a certain minimum amount of magnesium oxide. Thus, MgO is used in the ceramic reaction mixture at a minimum amount of at least about 5 parts (by wt.) per 100 parts of the solution.

Thicker tiles curl less even when made with the same ceramic, but without the advantages delivered by the present invention, the tile would have to be too thick to get even the minimum curl value. This also resulted in heavier tiles. Too much ceramic was needed, making the tile impractical and too costly. Advantageously, the present tiles do have low curl values, so that they are thinner, using less ceramic. The present invention can easily provide floor tiles down to about 0.25 inches, and the curl values are low enough to provide tiles of practical size.

In order to have curl resistance and the density and strength levels needed, the hard tile, a calcium aluminum magnesium phosphate ceramic is prepared by mixing 100 parts of a solution of aluminum phosphate and phosphoric acid with 1) from about 5 to about 10 parts of magnesium oxide and 2) from about 50 to about 110 parts of calcium silicate (wollastonite), or preferably from about 50 to about 80 parts (by wt.) per hundred parts of the solution (PPHS). The solution used is obtained by combining phosphoric acid and aluminum oxide in an amount of from about 10 to about 27 parts per hundred parts of phosphoric acid. For the aluminum oxide, alumina trihydrate can be used as well as alumina.

The weight ratio of the amount of wollastonite to magnesium oxide used acceptably is in the range of from about 16:1 to about 5:1. Although more MgO can be used, the larger amounts do not add to the ceramic's properties. In preferred cases, the ratio of the amount of wollastonite:magnesium oxide is at an amount in the range of from about 8:1 to about 12:1.

In order to get the minimum density and strength needed, either 1) platelets of a mineral selected from the group consisting of mica and vermiculite is combined with the ceramic reactants or 2) the amount of water allowed in the phosphoric acid (which is combined with the aluminum oxide) is limited to a maximum of about 15% by weight (wt.). If an even stronger tile is desired, platelets of mica or vermiculite can be added to the low-water ceramic mixture. A flexural strength of about 4500 PSI or more can be achieved using mica and/or vermiculite in these low water ceramic formulations. When platelets of mica or vermiculite are added, then the acid used can have up to about 29% by weight of water and still produce tiles with the minimum strength (2500 PSI of flexural strength).

Including the mica and/or vermiculite is one way to get a hard tile with a high flexural strength. Decreasing the amount of water, however, is another way to get hard tiles with higher densities and strength. For even higher density and strength, it is preferred to use less water with the addition of the mineral platelets to increase strength.

The amount of mica in the hard tile can acceptably be a minimum of about 3.5% by wt. for improvement to be seen in flexural strength; if vermiculite is used, slightly more will be needed (at least about 4.5%). Preferably, the mica (and/or vermiculite) is present in a range of from about 5 to about 45% by wt. of the tile.

Preferably a maximum of about 25% by wt. of water is used in the phosphoric acid. A preferred range is from about 25 to about 3% by wt. of water in the acid, although the acid used could go down to about 0% by wt. of water (almost no water) in the phosphoric acid. Steps such as mixing, pressing, and mold filling, however, will be more difficult with less water being used. If the reacting mixture is highly viscous, the tile can be finished by sanding and/or cutting the ceramic down to the desired shape and size after the reacting mixture sets, forming the ceramic. The tiles can also be polished or drilled.

The combination of reactants is mixed, preferably with shear. After mixing, the combination is then formed into the tile. Suitable procedures such as pressing, cutting, and molding can be used. The mixture is preferably pressed into a mold and allowed to cure into the hard tile. After the reaction mixture sets, the finished product has a smooth, finished surface desirable for tiles.

When the tiles are formed by molding, it is highly preferred to maintain the temperature of the solution at 20° C. or less when the wollastonite is combined with it. If the temperature is much greater than 20° C., the reaction forming the ceramic is so fast that the wet reacting mixture will harden before it can be molded.

It has been discovered that platelets of the mica and/or vermiculite will increase the modulus of rupture and breaking strength of the tile. This increase, moreover, is seen in all directions along which the modulus of rupture is measured. It is preferred to use mica and/or vermiculite to increase the strength and toughness of the tile. In addition to this, the platelets of mica and vermiculite help to make the tiles less brittle, more curl resistant and also serves to increase the dimensional stability of the tile.

The mica can acceptably be used at an amount in the range of from about 10 to about 115 PPHS (parts by weight per hundred parts of the solution); a preferred range for the amount of mica is from about 65 to about 90 PPHS. Mica is preferred. An acceptable amount of vermiculite is in the range of from about 20 to about 150 PPHS. When vermiculite is used instead of mica, slightly more will be added. Although it is preferred to use mica, because less of the mineral substance needs to be included, it is permissible to use a mixture of mica and vermiculite. A mixture of the minerals mica and vermiculite can suitably be used at an amount in the range of from about 12 to about 145 PPHS.

The average platelet size of the mica and vermiculite can acceptably be in the range of from about 2 millimeters (mm) to about 30 microns. It has been noted that, as the average platelet size increases over 500 microns, the strength decreases. If the average platelet size is less than about 40 microns, cracks are found in the ceramic. When better strength is desired, therefore, it is preferred that the average platelet size of the mica and/or vermiculite present is in the range of from about 500 microns to about 40 microns. The best strength has been found when the average platelet size is in the most preferred range of from about 300 to about 40 microns.

Fiber has been combined both as a filler and/or to increase strength. It has, however, been found that if fibers are included in the ceramic, they tend to align while mixing and milling the ceramic reactants in the tile preparation process. As a result of this alignment, the resulting tile is structurally reinforced only in one direction by the fibers. By using mica and/or vermiculite platelets, however, it is found that the ceramic is structurally reinforced in all directions.

For this reason, and also because many types and concentrations of fibers are detrimental to the appearance of the tiles, the use of fiber in the present phosphate ceramic hard tile is less preferred than using the mica and vermiculite platelets to increase strength, and the better hard tiles contain no fiber. Fiber can, however, be added to the reaction mixture if desired. If fiber is used, it is preferred to use fiber having a maximum average length of ¼ inch. It is also preferred that the maximum average aspect ratio of the fiber be less than 20. The fiber acceptably is used at an amount of about 40 PPHS or less. Acceptably the fiber can be used at an amount in the range of from 0 to about 40 PPHS.

Preferred fiber can be selected from the group consisting of glass fiber and wollastonite fiber. The most preferred fiber is wollastonite. It has been found that the typical wollastonite fiber is less reactive than the particulate wollastonite mineral. The wollastonite fiber thus tends to remain intact in the reacting mixture and will act as a fibrous reinforcement in the tile. Most preferably the wollastonite fiber is present at an amount in the range of from about 20 to about 30 PPHS.

If the mica or vermiculite is used, it is preferably added after the solution, wollastonite, and magnesium oxide are combined, although if desired it could be added along with the wollastonite (as a mixture). It is preferred to mix the wollastonite and the magnesium oxide ether before combining these reactants with the solution.

Pigments, dyes, and/or decorative particles can also be used. Preferably, these materials are added to the mixture of reactants after the solution is combined with the magnesium oxide and wollastonite, although these decorative materials could acceptably be added along with the wollastonite and/or magnesium oxide.

In the preferred preparation process, which forms a molded tile, the temperature of the phosphoric acid-aluminum phosphate solution is held at a maximum of about 20° C. and at that temperature, it is combined with a mixture of wollastonite and magnesium oxide. Even more preferably, the temperature of the solution is about −4° C. or less. The temperature can even go down to the freezing point, although the solution cannot be permitted to freeze. In addition to slowing the reaction, a lower solution temperature (less than 20° C.) is also beneficial in processing because it is easier to press air out of the wet mixture.

A dough-like consistency is preferred for the wet reaction mixture. This makes the reacting wet mixture ideal for molding. The instant method is particularly well suited for articles which require strength, dimensional stability, and high density. The process, therefore, is ideal for hard tiles.

In preferred processes the temperature is also controlled as the reacting mixture is pressed (or molded) into the tile shape. This provides advantages to the composition such as the improvement of the wet and dry modulus of rupture and a uniformly cured ceramic. In such processes, until the reacting mixture sets into the firm, hard tile, the mixture is heated slightly as the tile cures. Acceptable the temperature can be in the range of from about 30° to about 95° C. Preferably the pressing temperature is in the range of from about 45° to about 85° C.

Since the solution used to maintained at lower temperatures, it is advantageous and thus preferred to use heat during molding and pressing operations. This is especially the case with the embodiments having less water. The cooler solution temperatures and the low water conditions both act to slow down the reaction, delaying hardening ("setting") of the ceramic. Using heat in molding and pressing will speed curing, desirably shortening the tile preparation time and also insures a uniform cure.

If desired, the tile can be given a decorative design by embossing during molding or pressing, or even by cutting or sculpting the finished tile. Decorative effects can also be obtained by inserting a smaller piece of tile (an inlay), having contrasting shape, color and/or design. These smaller pieces can be inserted into a desired location cut or molded for it in another tile (thus making an inlaid tile). Alternatively, such contrasting, decorative tile pieces can be inserted into the molded (or pressed) wet ceramic before it sets into the hard tile. After the molded ceramic sets, a decorative inlaid tile is obtained. The inlays which are inserted into the wet ceramic can be cut or molded. Preferably the inlay is also a phosphate ceramic, although other materials can also be used if desired.

The hard tiles of the instant invention can be prepared in any convenient or conventional size and shape. Thickness of the tile has more importance when the end use of the tile (floor tiles, for example) requires it to bear weight, shock, or strain ("durable hard tiles"). In such cases the tiles can have the minimum thickness of about 0.25 inches but preferably will be thicker at a minimum of about 0.35.

The maximum thickness of the tile can be determined by practicality, need and the desire to minimize cost (thus minimizing materials used). The thickness of tiles can acceptably be in the range of from about 0.12 to about 1.25 inches, thicknesses greater than about 0.25 inches or in the range of from about 0.25 to about 1.25 inches being highly suited for tiles having larger surface areas (those with a length and width greater than about 3.5 inches), or for load bearing tiles, such as floors, patios and gardens. A good range for nonload-bearing tiles is from about 0.12 to about 0.25 inches. A preferred thickness for floor tiles is from about 0.25 to about 0.8 inches.

The length and width dimensions of the tiles can be any conventional or convenient size or shape. Those of ordinary skill can elect to have any appropriate dimensions for the hard tiles. Since fewer tiles are needed when the tiles are large, covering larger surface areas, it might be preferred to make tiles with longer length and/or width dimensions. Although, if desired, the tiles can be extremely small (for example, down to 0.25×0.25 in.). More commonly, however, the tiles will have a length and/or width dimension of at least about one inch. Preferred sizes for the length and/or width is in the range of from about 3 to about 24 inches, more preferably in the range of from about 7 to about 18 inches. Preferred dimensions of length and/or width for floor tiles are from about 3 to about 16 inches. Smaller, convenient sized floor and wall tiles are from about 3 to about 9 inches. If large area tiles are desired, they can have length and/or width dimensions in the range of from about 16 to about 25 inches.

The tiles can be molded or pressed and then cut. If desired, the tiles can be given particular shapes (rectangle, diamond, circular, oblong, etc.) in either cutting or molding. Protective or decorative overcoating, printing and/or painting are other alternatives which can be done if desired.

The following examples are offered to illustrate and they should not be taken to limit the invention. All parts and percentages in the foregoing description and in these examples are by weight unless otherwise indicated.

EXAMPLE 1

Phosphoric acid which was approximately 15% by wt. water was used to prepare an aluminum phosphate-phosphoric acid solution. This solution was prepared by mixing (in parts by weight) 20 parts $Al_2O_3 \cdot 3H_2O$ and 100 parts of the phosphoric acid.

To prepare the phosphate ceramic tile 560 parts of the above solution, at a temperature of 20° F. (about −6.6° C.) was mixed with a combination of 32 parts by wt. of magnesium oxide; 320 parts of wollastonite (calcium silicate) which had particle sizes less than 400 mesh (U.S. Standard—less than 37 microns). These ingredients were mixed on a shear mill for approximately 2 minutes and then 400 parts of mica (which had an average platelet size of 250 microns) was added.

The reacting mixture was mixed for another 2 minutes and then the plastic-like mass was sheeted off the mill into a flat bed press with the press platens heated to 180° F. The ceramic tile sample cured at this temperature for 2 minutes as it was pressed into a square hard tile which measured 9×9×0.25 inches. The press platens were then cooled to room temperature.

The sample was then removed and the flexural strength was measured using a standard ASTM 3-Point Loading Test. The ceramic tile sample was found to have flexural strength of 3000 psi.

EXAMPLE 2

Part A

An aluminum phosphate-phosphoric acid solution was prepared by combining 416 g (grams) of phosphoric acid (which was 15% by wt. water) and 84 g of alumina trihydrate (hydrated aluminum oxide).

This solution was held at −9.9° C. and was combined with 345 g of wollastonite (which had particles less than 37 microns), 129 g of wollastonite fibers, 34.5 g of magnesium oxide, 30 g of titanium dioxide, 3 g of tan pigment, and 342 g of mica having an average platelet size of 250 microns.

The reacting mixture was mixed for another 2 minutes and then the plastic-like mass was sheeted off the mill into a press which had platens heated to 81.4° C. The sample cured into a ceramic at this temperature for 2 minutes as it was pressed into a hard tile which was 9×9×0.25 inches. The press platens were then cooled to room temperature.

The sample was then removed and the flexural strength was measured using a standard ASTM 3-Point Loading Test. The ceramic tile sample was found to have flexural strength of 5049 psi.

To measure curl value, the hard tile sample was put on a concrete slab that had been allowed to sit in water so that it was wet. After the tile sat for 3 hours, the amount of curl (curl value) measured was 9 mils.

Part B

The following formulation shows the preparation of a hard tile using a solution which had more water. The resulting tile shows a higher curl value and a good but lower flexural strength than the tile prepared in Part A.

An aluminum phosphate, phosphoric acid solution was prepared by combining 441.4 g (grams) of phosphoric acid (which was 25% by wt. water) and 58.6 g of alumina trihydrate.

This solution was held at −9.9° C. and was combined with 345 g of wollastonite (which had particles less than 37 microns in diameter) 129 g of wollastonite fibers, 34.5 g of magnesium oxide, 30 g of titanium dioxide, 3 g of tan pigment, and 342 g of mica which had an average platelet size of 250 microns.

The reacting mixture was mixed for another 2 minutes and then the plastic-like mass was sheeted off the mill into a press which had platens heated to 81.4° C. The sample cured into a ceramic at this temperature for 2 minutes as it was pressed into a 9×9×0.25 inch hard tile. The press platens were then cooled to room temperature.

The sample was then removed and the flexural strength was measured using a standard ASTM 3-Point Loading Test. The ceramic tile sample was found to have flexural strength of 3982 psi.

To measure curl the hard tile sample was put on a concrete slab that had been allowed to sit in water so that it was wet. After 3 hours, the curl value of the tile was measured at 18 mils.

The above comparison shows that higher strength hard tiles can be prepared by using phosphoric acid with less water.

What is claimed is:

1. A ceramic hard tile for surface-covering and decoration which comprises a calcium aluminum magnesium phosphate ceramic having a density in excess of about 110 pounds per cubic foot, a curl value less than about 20 mils and a flexural strength of at least about 2500 pounds per square inch; wherein the calcium aluminum magnesium phosphate ceramic was made by combining magnesium oxide in an amount of from about 5 to about 10 parts by weight and from about 50 to about 110 parts by weight of wollastonite, with 100 parts by weight of a solution of aluminum phosphate and phosphoric acid to form a reacting mixture, further providing that the solution was a combination which consisted of from about 10 to about 27 parts by weight of aluminum oxide per hundred parts by weight of phosphoric acid, wherein furthermore, either
   i) the phosphoric acid was a maximum of about 15% by weight water, or
   ii) the phosphoric acid was a maximum of about 29% by weight water and platelets of a mineral selected from the group consisting of mica and vermiculite were also combined to form the reacting mixture; mixing the reacting mixture and thereafter pressing the reacting mixture as it cures to produce the ceramic.

2. The hard tile of claim 1 wherein the mixture was formed using ii), the phosphoric acid that was a maximum of about 29% by weight water and wherein the platelets had an average size of at least about 40 microns.

3. The hard tile of claim 1 wherein the density is at least about 135 pounds per cubic foot.

4. The hard tile of claim 1 wherein the platelets have an average size in the range of from about 40 to about 500 microns.

5. The hard tile of claim 1 wherein the temperature of the solution was a maximum of about 20° C. when it was mixed with the magnesium oxide and wollastonite.

6. The hard tile of claim 1 wherein the calcium aluminum magnesium phosphate ceramic has a porosity of about 7% or less.

7. The hard tile of claim 1 which is either a floor tile, a garden tile, or a patio tile.

8. The hard tile of claim 1 which has a flexural strength of about 3500 pounds per square inch or greater.

9. The hard tile of claim 1 wherein the platelets are: A) present at an amount in the range of from about 10 to about 115 parts by weight per hundred parts of the solution if the mineral is mica; B) present at an amount in the range of from about 20 to about 150 parts by weight per hundred parts of the solution if the mineral is vermiculite; or C) present at an amount in the range of from about 12 to about 145 parts by weight per hundred parts of the solution if the mineral is mica and vermiculite.

10. The hard tile of claim 1 which contains fiber selected from the group consisting of glass and wollastonite.

11. The hard tile of claim 7 which is a floor tile which has an inlay.

12. The hard tile of claim 1 wherein as the reaction mixture cured it was pressed at a temperature in the range of from about 30° to about 95° C.

13. A process for a calcium aluminum magnesium phosphate ceramic hard tile which comprises
1) reacting aluminum oxide in phosphoric acid, wherein the aluminum oxide is present at an amount of from about 10 to about 27 parts per hundred parts by weight of the acid, to form an aluminum phosphate-phosphoric acid solution, and
2) combining 100 parts by weight of an aluminum phosphate-phosphoric acid solution with magnesium oxide at an amount in the range of from about 5 to about 10 parts by weight and wollastonite at an amount in the range of from about 50 to about 110 parts by weight to form a reacting mixture providing, however, that the solution was a combination which consisted of from about 10 to about 27 parts by weight of aluminum oxide per hundred parts by weight of phosphoric acid and further providing that wit her i) the phosphoric acid was a maximum of about 15% by weight water, or ii) the phosphoric acid was a maximum of about 29% by weight water and platelets of a mineral selected from the group consisting of mica and vermiculite was also combined; and mixing the reacting mixture; and then
pressing the reacting mixture into a hard tile.

14. The process of claim 13 wherein the solution is at a temperature less than 20° C. when it is mixed with the wollastonite and the magnesium oxide.

15. The process of claim 13 wherein the mixture was formed using ii), the phosphoric acid that was a maximum of about 29% by weight water wherein further, the platelets have an average size in the range of from about 40 microns to about 500 microns.

16. The process of claim 15 wherein the platelets are: A) present at an amount in the range of from about 10 to about 115 parts by weight per hundred parts of the solution if the mineral is mica; B) present at an amount in the range of from about 20 to about 150 parts by weight per hundred parts of the solution if the mineral is vermiculite; and C) present at an amount in the range of from about 12 to about 145 parts by weight per hundred parts of the solution if the mineral is mica and vermiculite.

* * * * *